June 26, 1934.  A. B. WELTY  1,964,491
HARVESTER THRESHER
Filed Sept. 24, 1932  3 Sheets-Sheet 3
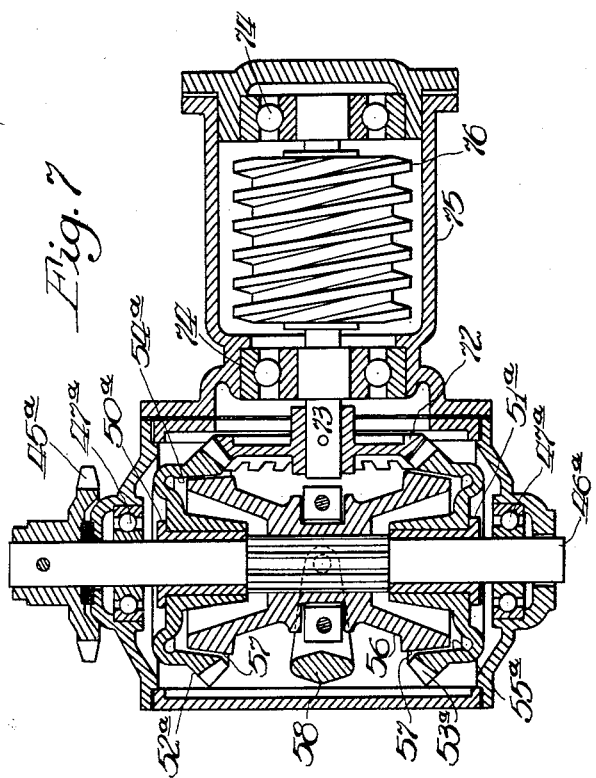
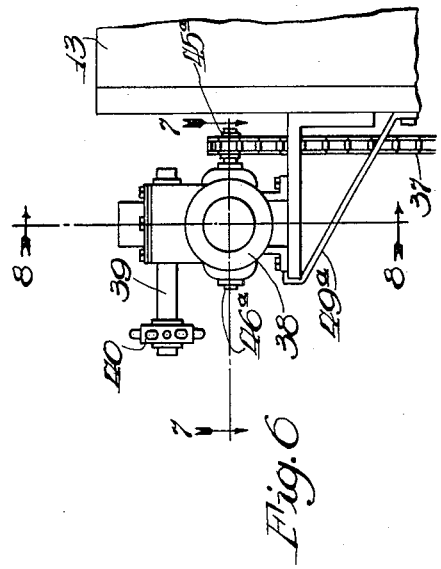
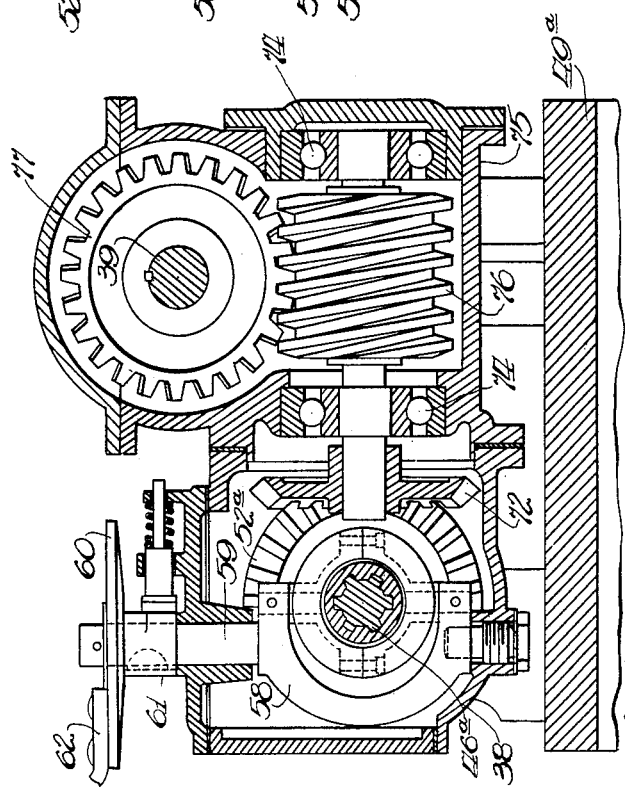
Inventor
Albert B. Welty
By his Attorney Patented June 26, 1934

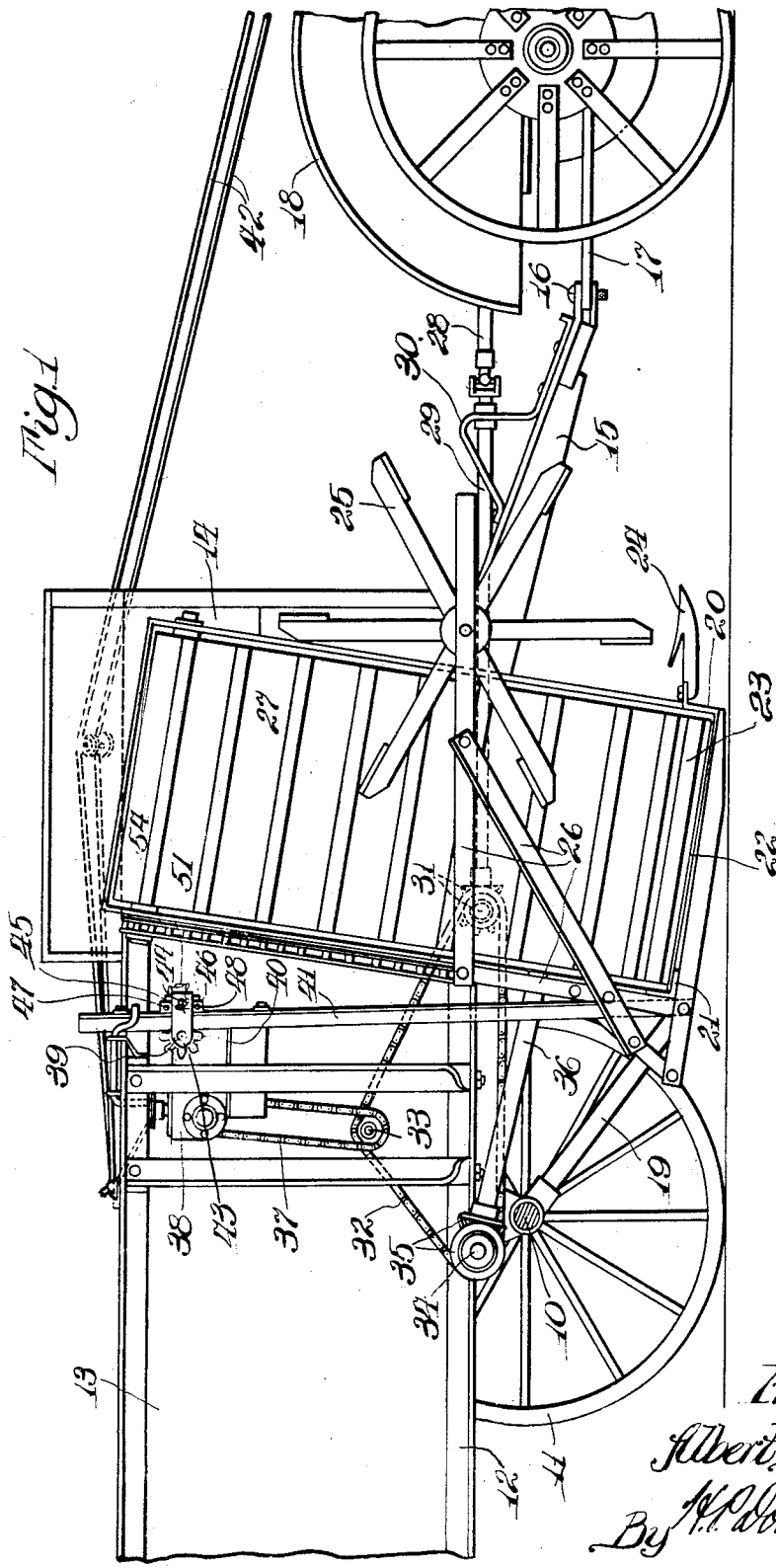

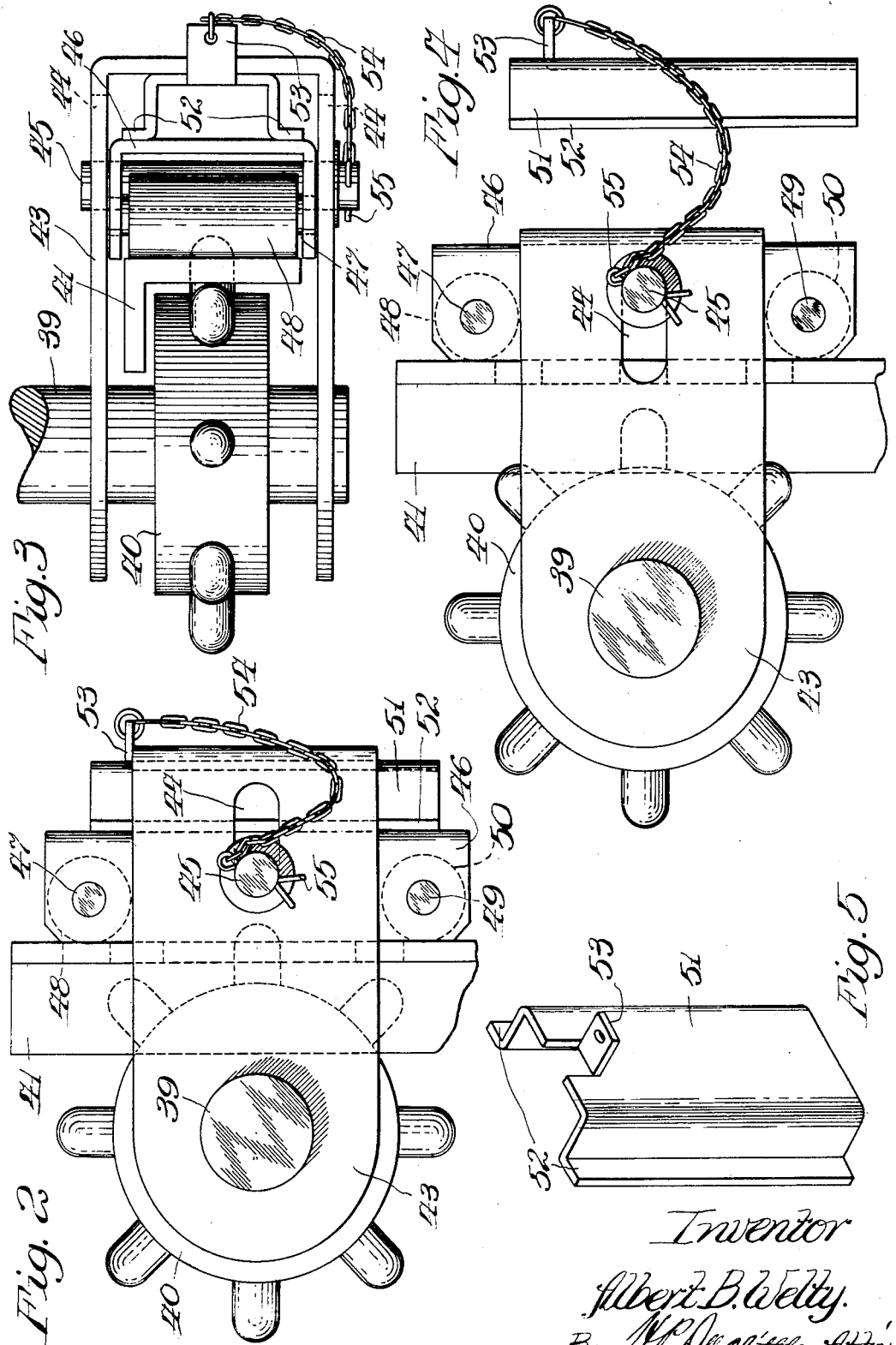

1,964,491

UNITED STATES PATENT OFFICE 1,964,491

HARVESTER THRESHER

Albert B. Welty, Kenilworth, Ill., assignor to International Harvester Company, a corporation of New Jersey Application September 24, 1932, Serial No. 634,648

13 Claims. (Cl. 56—20)

This invention relates to harvester threshers, and more particularly to a release for the power platform control used in such machines.

The harvester thresher herein disclosed is of the type shown in my co-pending United States patent application Serial No. 527,880 filed April 6, 1931, this harvester thresher being of the type which is directly connected to the drawbar of a tractor to be pulled thereby, said tractor having a power take-off shaft which is connected to drive the various operative elements of the harvester thresher at the same time that it is being pulled by the tractor. Instead of employing a hand lever or similar hand operated means for raising and lowering the header platform in accordance with the height of grain encountered as the machine traverses the harvest field, this type of harvester thresher employs a power actuated rack bar for performing this function, such rack bar being remotely controlled to move up or down in performing this function by means accessible to the driver seated on the tractor. This rack is operated by a power driven rack wheel that must be held positively in engagement with the rack, properly to perform its function of driving the rack.

Such construction, while operating perfectly successfully, has a slight disadvantage, because, when the engine on the tractor is not driving the power take-off shaft and the parts of the harvester thresher connected thereto, the rack is held in locked position by the said rack wheel and, as a result, the platform is maintained locked, so to speak, in a given position of adjustment. Should the operator desire to make an inspection of certain parts of the thresher, such for example as the inside of the feeder house, he may find that the platform is in such position with respect to the feeder house as to make it virtually impossible properly to make such inspection. Therefore, it is highly desirable that some means be provided which will permit the operator easily and quickly to release the rack wheel from the rack bar, so that through the medium of the usual counterbalance for the platform the operator may push the platform up or down manually, to place it in any position he may desire to have it, so as to permit him to make the desired inspection without having to start his motor on the tractor or to operatively connect the power take-off with the engine to operate all of the mechanism of the harvester thresher, including the platform adjusting mechanism. Then, again, there are times when the motor on the tractor may temporarily be out of commission, and the operator could not power actuate his platform, and at such times a release for the rack wheel is again desirable when inspection work about the harvester thresher may be necessary during the time that the motor on the tractor is being repaired.

The principal object of this invention, therefore, is to provide an improved power actuated platform adjusting mechanism for harvester threshers.

More specifically, the object is to provide a new mounting for the rack wheel which actuates the platform adjusting rack bar to permit the operator quickly and easily to release the rack wheel from the rack bar for the purpose stated.

Other objects will become known to those skilled in this art as the disclosure of the invention is more fully made.

These desirable objects are briefly accomplished in a machine of the type described by providing a novel mounting structure for the rack wheel that actuates the rack bar, such mounting structure including a removable space block, which holds the rack wheel in operative position with respect to the rack bar when it is in normal position and, when said space block is removed, permits quick and easy disengagement of the rack wheel relative to the rack bar, all as will later be more particularly described.

In the accompanying sheets of drawings illustrating the improvement in one practicable form,—

Figure 1 is a general side elevational view of the harvester thresher with a part of the tractor being shown;

Figure 2 is a side elevational detail view of the rack bar and rack wheel with the release mechanism not functioning, so that the wheel and rack are in operative position with respect to each other;

Figure 3 is a top plan view of the structure shown in Figure 2;

Figure 4 is a view similar to Figure 3, but showing the space block element released, so that the rack bar can be removed from the rack wheel, as shown in said figure;

Figure 5 is a perspective detail view of the release wedge element per se;

Figure 6 is a front elevational view of the power lift unit;

Figure 7 is a horizontal sectional view on an enlarged scale through the power lift unit, as seen along the line 7—7 appearing in Figure 6, looking in the direction of the arrows; and, Figure 8 is a vertical sectional view through the power lift unit, on an enlarged scale, as viewed along the line 8—8 of Figure 6, looking in the direction of the arrows.

As heretofore stated, the harvester thresher is of the type shown in my co-pending United States application Serial No. 527,880 filed April 6, 1931, and, for a fuller description thereof, reference should be had to such application. For the purpose of illustrating the present improvement it will suffice to say that the harvester thresher generally is carried on the usual transverse axle 10 journaled in carrying wheels 11, only one of which is shown, said axle supporting the main frame element 12 that carries the thresher body 13 and at its front end the thresher body feed house 14, the main frame 12 being extended forwardly and downwardly to provide a hitch element 15 which is pivotally and removably pinned at 16 to the draw element 17 of a tractor generally indicated at 18.

The axle 10 also carries in the usual way downwardly and forwardly extending line bars 19, which are pivotally connected to the axle, the forward end of the line bars in the conventional manner carrying the platform Z-bar 20, and at a rearward point, the angle bar 21, said bars carrying the sheet metal platform 22, upon which is mounted a transversely running conveyor apron 23 that receives the cut grain from the cutting apparatus indicated by guard fingers 24 connected to the Z-bar 20 and by means of a reel 25 mounted on the frame structure 26 carried by the platform frame structure. The cut grain is delivered transversely and stubblewardly in the usual way by the conveyor 23 to an elevator spout indicated at 27, that discharges into the feed house 14, all as is well understood in this art.

The various operative elements within the thresher body 13 and the operative parts of the harvester header part are all power actuated from the power take-off shaft 28 shown extending out at the rear of the tractor, such shaft connecting with a line shaft 29 supported in a bracket 30 on the draft element 15. Said line shaft 29 is appropriately geared through shaft and gearing 31 carried beneath the main frame 12 to drive a chain 32, shaft 33 carried in the separator body, and a shaft 34 similarly mounted on the frame 12 or body 13 of the thresher, there being gearing 35 driven from said shaft 34 to operate a shaft 36 which extends ahead to drive the reel 25 and cutting mechanism in a conventional way not necessary here to describe. From the shaft 33, a chain 37 is driven to operate reverse gearing contained in a gear box 38 carried on the grainward side of the thresher body 13 in the position shown; said gearing in the case 38 driving clockwise or counter-clockwise, as desired, a shaft 39, which extends out of said case, upon which shaft is carried a rack wheel 40.

The drive in the box 38 for the wheel 40 will now be described. As viewed in Figures 1 and 6, the chain drives a sprocket wheel 45ª (see Figure 7) which is pinned to a transverse shaft 46ª journaled in bearings 47ª mounted in the casing 38 carried on a shelf 49ª appropriately supported from the grainward side of the thresher body or housing 13.

As shown in Figure 7, this shaft 46ª within the case 38 carries two spaced sleeves 50ª, 51ª on which are loosely and turnably carried two bevel gears 52ª, 53ª, respectively, each of which gears respectively includes internal cone clutch faces 54ª, 55ª. The central portion of the shaft 46ª between the two spaced sleeves 50ª, 51ª is splined slidably to carry a double clutch element 56 presenting opposite cone clutch surfaces 57 complementary to the surfaces 54ª, 55ª. A shifter fork 58 encircles the element 56, said fork 58 being actuated left or right by a vertical rockshaft 59 to which it is connected, as shown in Figure 8. This shaft 59 protrudes upwardly through the top of the casing 38, where it is held in a circular horizontal plate 60 formed on a sleeve 61 surrounding the shaft 59, to which it is keyed, and resting turnably on top of the case 38. Connected to the plate 60 is a rearwardly extending arm 62, which is connected to lever and link mechanism on top of the housing 13, having connection in turn to a pair of remote control reins 42. As described in my co-pending application, the controls just described permit the operator, from his seat on the tractor, to shift the clutch 56 either right or left for a purpose presently to appear.

The bevel gears 52ª, 53ª, as shown in Figures 7 and 8, are in constant mesh with a gear 72 which is made fast on a shaft 73 journaled in bearings 74 located in an extension 75 of the case 38. Within this case extension 75, the shaft 73 carries and turns a worm pinion 76 in mesh with a worm gear 77 (see Figure 8) made fast to a shaft 39, which is the shaft that extends out of the box 38 and carries the pin wheel 40, as heretofore described.

The pin teeth on the rack wheel 40 are intended to mesh with a series of spaced openings in a substantially vertically disposed rack bar 41, said rack bar being an angle iron, as shown, and being connected at its lower end to the platform frame structure adjacent angle bar 21, so that, as the rack bar is power actuated up or down by the pin rack wheel 40, the platform and cutting apparatus 24 will be adjusted up or down to conform with the height of grain being encountered, so that the grain will be properly headed. This rack wheel 40 is driven clockwise or counter-clockwise at the option of the operator seated on his station on the tractor where he has accessible to his reach a pair of reins 42, that permit of reversing the gearing in the case 38, all as described in my previously mentioned co-pending patent application.

As stated in the introduction of this specification, it is desirable at times to permit release of this pin rack wheel from the rack bar, so that, when the outfit is standing still, an operator can push the platform up or down at will by hand, as for example when the motor is broken down or when it is not desirable to utilize the power to perform this function, all as heretofore explained.

Accordingly, the shaft 39 carries a bifurcated or U-shaped bracket 43, said rack wheel 40 being disposed between the legs of the bracket 43, as shown in Figure 3, and the angle bar rack 41 also passing through said bracket in the manner shown. The opposite sides of this bracket are provided with aligned, elongated, horizontally extending slots 44, in which slots is carried a cross-pin 45. This pin 45 also is carried in a channel-shaped space block element 46, which channel-shaped space block is vertically disposed and carries at its upper end a cross-pin 47 to mount a roller 48, and at its lower end, a cross-pin 49 to mount another roller 50. These rollers 48 and 50 rollingly engage the rack bar 41, to hold the same to duty against the rack wheel 40, the rollers being disposed on opposite sides of the point where the teeth of the rack wheel engage the rack bar holes, as best shown in Figure 2.

Between the vertical wall of the channel-shaped spacer block 46 and the adjacent wall of the channel-shaped bracket 43 is slidingly carried a channel-shaped wedge element 51 having at opposite sides, laterally extending wings 52, to engage the wall of the channel-shaped space bar 46, and a cut-out portion at its upper end to provide an outwardly extending tongue or finger piece 53, said finger piece being provided with an eye to receive a chain 54, said chain having its opposite end connected to a cotter key 55 passed through the ends of the pin 45.

With the channel-shaped wedge member 51 in place, as shown in Figures 1, 2 and 3, the block 46 is moved toward the rack wheel 40, so that its rollers 48 and 50 press the rack bar 41 rollingly against the rack wheel, so that the rack wheel and rack bar will be in operative engagement. When it is desired to operate the rack bar 41 up or down without the use of power from the engine, then the operator engages the tongue or finger piece 53 and slips the wedge 51 upwardly out of the bracket 43 in the manner shown in Figure 4, so that the block 46 can be slid back or away from the rack bar, this movement being guided by the pin 45 in slots 44. It is now possible also to move the rack bar 41 out of engagement with the rack wheel 40, thus disconnecting the rack bar from the power drive connections to permit up and down movement of the platform without interference from the rack bar and pinion wheel, which normally are locked together to prevent such manual adjustment of the platform. The chain 54 heretofore described prevents loss of the channel wedge 51 and serves merely as a means to tie the wedge in a position where it will be always accessible and not get lost.

From this description it will now be plain that a simple and improved construction has been provided for performing the desired functions and which achieves all of the desirable objects heretofore recited, this improvement being available for use on standard combines of this type without materially altering their construction or without incurring any prohibitive costs.

It is the intention herein to cover all such changes and modifications of the illustrative example of the invention herein shown as do not depart from the spirit and scope of the invention as indicated in the following claims.

What is claimed is:

1. In a harvester thresher, a platform carried for up and down adjustment, a bar connected to adjust the platform, power actuated lift means to operate the bar and hold it locked to maintain the platform fixed in adjusted position, and means normally engaging the power actuated means and bar, said means being releasable to free the bar from the power actuated means to adapt the platform for movement independently of said power actuated means.

2. In a harvester thresher, an adjustably mounted platform, a rack bar for adjusting the platform, a power driven toothed wheel to move the rack bar and hold it with the platform in adjusted position, means to hold the bar and wheel normally engaged, said means being removable, whereby the bar and wheel may be disengaged to enable the platform to be moved manually.

3. In a harvester thresher, an adjustably mounted platform, a rack bar for adjusting the platform, a power driven toothed wheel to move the rack bar and hold it with the platform in adjusted position, a bracket carried adjacent the wheel, a spacer block carried by the bracket, and a wedge to hold the block in a position to engage the rack and wheel.

4. In a harvester thresher, an adjustably mounted platform, a rack bar for adjusting the platform, a power driven toothed wheel to move the rack bar and hold it with the platform in adjusted position, a bracket carried adjacent the wheel, a block mounted on the bracket to engage the rack bar and wheel, and a wedge to hold the parts in such position, said wedge being removable to permit disengagement of the rack bar and wheel.

5. In a harvester thresher, an adjustably mounted platform, a rack bar for adjusting the platform, a power driven toothed wheel to move the rack bar and hold it with the platform in adjusted position, a bracket carried adjacent the wheel, a spacer block slidably mounted on the bracket, and means carried by the bracket to hold the block in a position to engage the rack bar with the wheel, said means being removable to enable the block to be slid in a direction to free the rack from the wheel.

6. In a harvester thresher, an adjustably mounted platform, a rack bar for adjusting the platform, a power driven toothed wheel to move the rack bar and hold it with the platform in adjusted position, a bracket carried adjacent the wheel, a block slidably mounted on the bracket, rollers on the block, said block in one position adapted to hold the bar operatively engaged with the wheel, the rollers engaging the rack bar, and means to hold the block in such position, said means being removable to enable the block to be slid away from the wheel to free the rack bar therefrom.

7. In a harvester thresher, an adjustably mounted platform, a rack bar for adjusting the platform, a power driven toothed wheel to move the rack bar and hold it with the platform in adjusted position, a bracket carried adjacent the wheel, a block movably mounted in the bracket, the rack bar passed through the bracket and held to duty against the wheel by said block, and removable means adapted to be held in the bracket to hold the block in such position.

8. In a harvester thresher, an adjustably mounted platform, a rack bar for adjusting the platform, a power driven toothed wheel to move the rack bar and hold it with the platform in adjusted position, a U-shaped fixed bracket embracing the wheel, a block slidably mounted in the bracket, the rack bar passed through the bracket and held to duty against the wheel by said block, and a wedge member removably carried between the block and bight wall of the U-bracket, said block being slidable away from the rack bar when the wedge member has been removed to free the rack bar from the wheel.

9. In a harvester thresher, a thresher part, a platform carried for up and down movement, a substantially vertically extending rack bar supported from the thresher part, a rack wheel to move the bar up and down, said bar being connected to raise and lower the platform when the rack wheel meshes with the bar and moves the same, said rack wheel serving to lock the bar and platform in set positions, and means whereby the rack wheel may be disengaged from the bar to enable the platform and bar to be moved independently of the rack wheel.

10. In a harvester thresher, a thresher part, a platform carried for up and down movement, a substantially vertically extending rack bar supported from the thresher part, a power driven rack wheel normally in mesh with the bar to move the same up and down, said bar being connected to raise and lower the platform when the rack wheel turns and meshes with the bar, said rack wheel when not driven serving as a lock to hold the platform in a set position, and means whereby the rack wheel may be disengaged from the bar to enable the platform and bar to be moved independently of the rack wheel.

11. In a harvester thresher, a platform carried for up and down adjustment, a power lift and lock for the platform comprising normally engaged cooperating lift elements, and means to hold said cooperating lift elements normally engaged, said means adapted to be released to enable the platform to be moved independently of said power lift.

12. In a harvester, a gathering member carried for up and down adjustment, a power lift and lock for the member comprising normally engaged cooperating lift elements, and means to hold said cooperating lift elements normally engaged, said means adapted to be released to enable the adjustable member to be moved independently of said power lift.

13. In a harvester, a gathering member carried for up and down adjustment, a power lift and lock for the member comprising normally engaged rack bar and wheel elements, and means to hold said elements normally engaged, said means adapted to be released to enable the adjustable member to be moved independently of said power lift.

ALBERT B. WELTY.